United States Patent [19]
Edwards

[11] 3,715,106
[45] Feb. 6, 1973

[54] FEED ARRANGEMENTS FOR A MIXER OR MIXER-CONVEYOR UNIT

[75] Inventor: Albert Edwards, Peterborough, England

[73] Assignee: Baker Perkins Limited, Peterborough, England

[22] Filed: Jan. 11, 1971

[21] Appl. No.: 105,422

[30] Foreign Application Priority Data

Jan. 27, 1970 Great Britain..................3,983/70

[52] U.S. Cl..................................................259/25
[51] Int. Cl. ..............................................B01f 7/02
[58] Field of Search..........259/164, 165, 178, 25, 26, 259/21, 22, 179, 161, 154

[56] References Cited

UNITED STATES PATENTS

| | | | |
|---|---|---|---|
| 1,506,143 | 8/1924 | Stubbs | 259/178 |
| 764,557 | 7/1904 | Campbell | 259/164 |
| 931,657 | 8/1909 | Scott | 259/26 |
| 1,198,900 | 9/1916 | Eggert | 259/25 |

*Primary Examiner*—Robert W. Jenkins
*Attorney*—Larson, Taylor and Hinds

[57] ABSTRACT

A feed arrangement for providing a controlled rate of feed of free-flowing material to a screw-type conveyor. The arrangement consists of a gate opening in the side of the conveyor barrel, a sliding sleeve around the barrel leaving an opening adapted to register with the barrel opening to a varying degree dependent on the position of the sleeve, and a supply enclosure above the barrel with a partition for directing material towards the gate.

5 Claims, 1 Drawing Figure

PATENTED FEB 6 1973　　　　　　　　　　　3,715,106
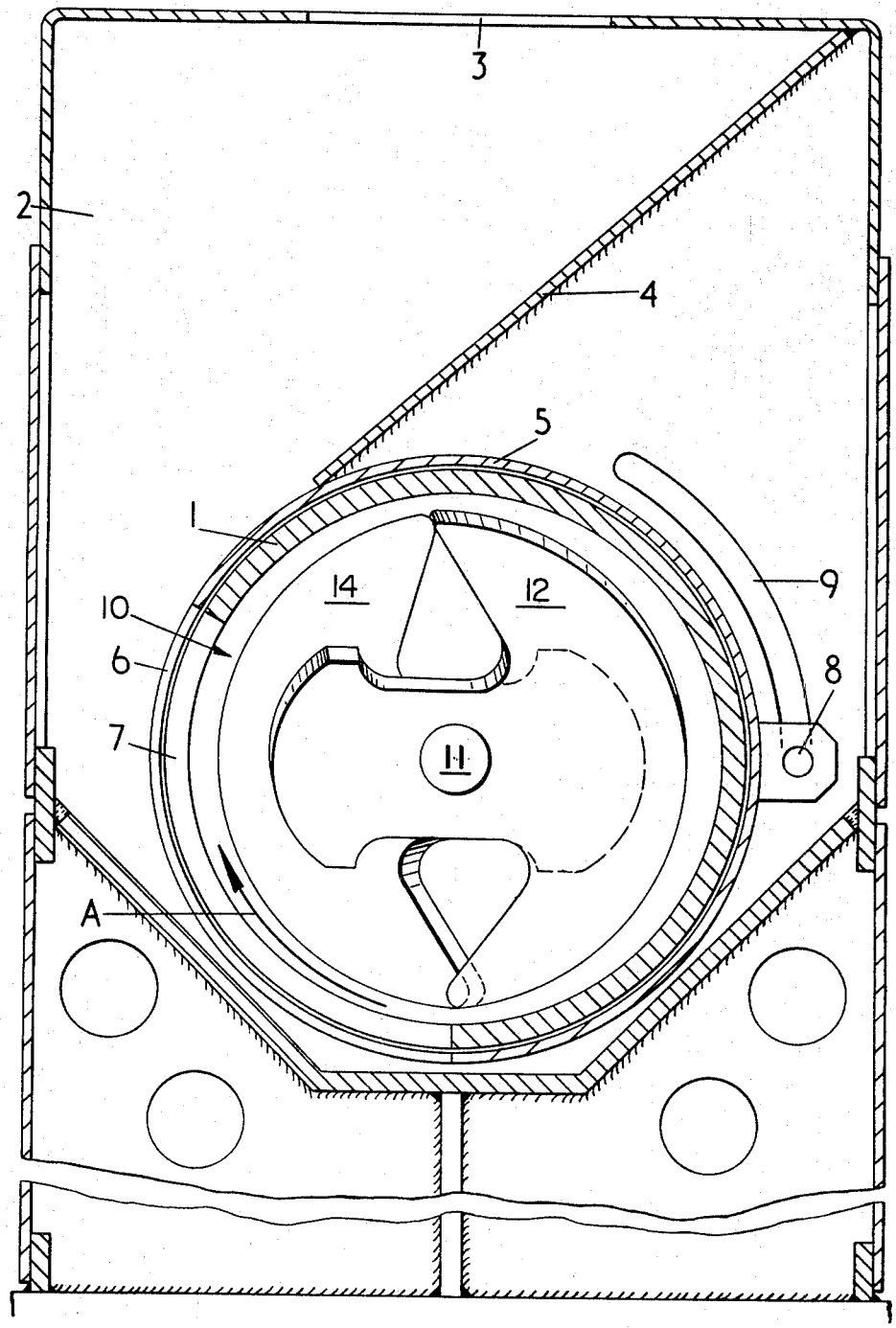
INVENTOR
ALBERT EDWARDS

FEED ARRANGEMENTS FOR A MIXER OR MIXER-CONVEYOR UNIT

This invention relates to a feed arrangement for a rotary screw-type conveyor unit or mixer conveyor unit for free flowing materials, particularly particulate materials such as foundry sands where a controlled rate of material feed to the unit is required. The invention is applicable for example to a mixer-conveyor unit of the kind described in our earlier British Pat. specification No. 1051651.

The invention consists in a feed arrangement for providing a controlled rate of feed of free-flowing material to a screw type conveyor or mixer conveyor unit comprising a barrel, and a conveyor or mixer-conveyor element within the barrel, the feed arrangement comprising an enclosure at least partially surrounding the barrel and having a material inlet above the axis of the barrel, material directing means within the enclosure for directing material from the inlet towards one side of the barrel and an adjustable gate arrangement at said one side of the barrel for allowing material to flow into the barrel from the enclosure at a controlled rate of feed dependent on the degree of opening of the gate arrangement.

In a preferred form of the invention, the gate arrangement comprises an opening in the barrel and a sleeve surrounding the barrel, which sleeve also has an opening formed therein, the sleeve being rotatable around the barrel so that the degree of registration between said openings can be adjusted to vary the feed rate of the gate arrangement. This form of gate arrangement can, according to another aspect of the invention, be employed as a feed control on a conveyor or mixer conveyor unit independently of the remaining features set out in the preceding paragraph.

The invention will now be described by way of an example with reference to the accompanying drawing which is a cross section through a mixer-conveyor unit of the type disclosed in the above mentioned patent specification.

The unit has a cylindrical barrel 1 including a vane-type mixer-conveyor element 10 for delivering materials from separate inlets at one end of the barrel to an outlet at the other end of the barrel whilst mixing the materials. The vane-type mixer conveyor 10 shown is of the type disclosed in Great Britain Patent No. 1,051,651 and includes a plurality of tilted discs secured to shaft 11, two discs 12 and 14 being shown in the drawing. For feeding one or each material (say foundry sand and a binder) to the barrel at a controlled rate a feed arrangement as illustrated is provided.

The or each feed arrangement comprises an enclosure 2 surrounding the barrel and having a material inlet 3 above the barrel axis, and a partition 4 for directing material from the inlet to an adjustable gate at the left hand side of the barrel as illustrated. The gate comprises a sleeve 5 rotatable through 60° around the barrel and having an opening 6 registering with an opening 7 in the barrel. The sleeve has an adjustable member 8 operative in a 60° segment 9 in which it can be releasably locked in any position for altering the degree of registration between the openings 6 and 7 to vary the effective opening between the enclosure and the barrel and thereby control the rate of feed of material into the barrel.

In use, the mixer conveyor element is rotated in the direction of arrow A and the enclosure receives material (say sand) from a feed hopper with which the enclosure is in permanent communication so that a constant head of material is maintained in the enclosure, whilst the material is delivered to the barrel at a controlled rate dependent on the degree of opening of the gate.

In an alternative arrangement according to the invention, the sleeve 5 is omitted, the barrel having a plane opening 7, and the length of the partition 4 is made adjustable to form, in conjunction with the barrel opening an adjustable gate arrangement.

I claim:

1. A feed arrangement for providing a controlled rate of feed of free-flowing material to a screw-type conveyor or mixer-conveyor unit comprising a barrel, and a conveyor or mixer-conveyor element within the barrel, the feed arrangement comprising an enclosure at least partially surrounding the barrel and having a material inlet above the axis of the barrel, material directing means within the enclosure for directing material from the inlet towards one side of the barrel and an adjustable gate arrangement at said one side of the barrel for allowing material to flow into the barrel from the enclosure at a controlled rate of feed dependent on the degree of opening of the gate arrangement, said gate comprising an opening in the barrel and a sleeve surrounding the barrel, which sleeve also has an opening formed therein, the sleeve being rotatable around the barrel so that the degree of registration between said openings can be adjusted to vary the feed rate of the gate arrangement.

2. An arrangement as claimed in claim 1 including a pin and segment locking arrangement for releasably securing the sleeve in a selected position relative to the barrel for a required degree of opening of the gate arrangement.

3. An arrangement as claimed in claim 2 wherein the openings in the barrel and in the sleeve are substantially circumferentially co-extensive and the segment has an angular extent equal to half that of the openings.

4. An arrangement as claimed in claim 1 wherein the material directing means comprises an inclined partition within the enclosure.

5. A feed arrangement as claimed in claim 4 as dependent on claim 1 wherein the adjustable gate arrangement comprises an opening in the side of the barrel, and means for adjusting the length of the partition.

* * * * *